Nov. 23, 1965   C. E. JOHANSON   3,218,862
MOTION CORRECTION MECHANISMS
Filed March 29, 1962
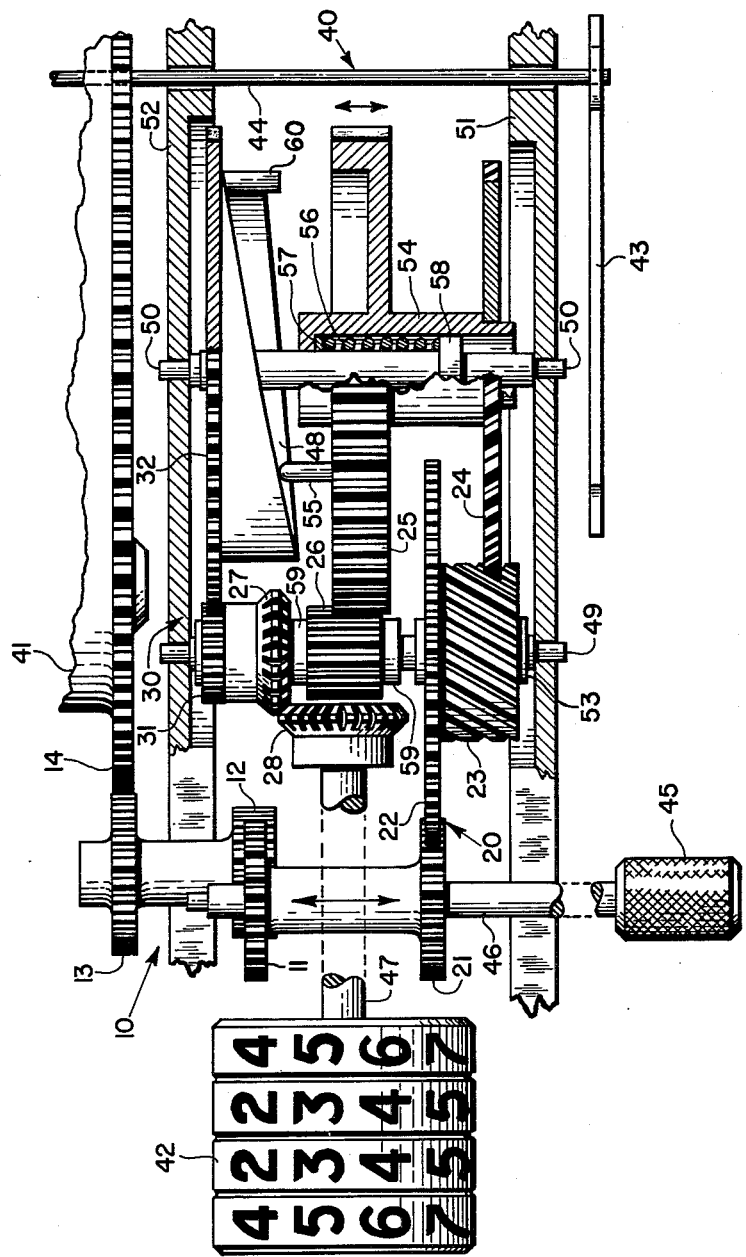
INVENTOR
C. E. JOHANSON
BY
Roger W Nolan Jr
ATTORNEY United States Patent Office 3,218,862
Patented Nov. 23, 1965

1

3,218,862
MOTION CORRECTION MECHANISMS
Carl E. Johanson, Davenport, Iowa, assignor to The Bendix Corporation, Davenport, Iowa, a corporation of Delaware
Filed Mar. 29, 1962, Ser. No. 183,575
9 Claims. (Cl. 73—384)

This invention relates to a motion correction mechanism for producing a non-linear relationship and more particularly to an improved mechanism for introducing into an altimeter a correction for barometric pressure.

Many mechanisms are known which will produce a non-linear output motion from a driven linear input motion. The gear trains of these mechanisms include differentials, and slow rotating cams which require a substantial gear reduction for operation.

An object of the present invention is to provide a motion correction mechanism wherein the differentials, and major gear reduction for cam operations are eliminated.

Another object of the present invention is to provide a motion correction mechanism having a cam positioned helical gear set.

A further object of the present invention is to provide a motion correction mechanism wherein the relative cam and follower rotation is maintained at less than one revolution for an actual rotation of the cam and follower greater than one revolution.

The invention is more clearly illustrated in its novel use in an altimeter having barometric pressure correction. The invention will be illustrated as used in an altimeter but should not be considered to be limited thereto.

The terminology used herein pertaining to altimeters and barometric pressure mechanisms is to have a meaning consistent with the meaning applied for the same terminology in "Tables and Data for Computing Airspeeds, Altitudes and Mach Number" published in 1953 by the Battelle Memorial Institute.

Barometric pressure correction is required in altimeters to give an accurate indication of pressure altitude because the sensed pressure does not give a true indication of pressure altitude above sea level due to variations in ground level barometric pressure. In altimeters wherein the correction is introduced by means of a mechanical adjustment the correction may be made in several different ways. One method is accomplished by manually moving an adjustable index on the altimeter dial to the feet of altitude corresponding to the ground level barometric pressure thereby indicating ground level at the particular feet of altitude. A second method is to manually introduce into the altimeter mechanism an adjustment corresponding to ground level barometric pressure corrected at sea level whereby sea level is indicated on the altimeter dial as zero feet of altitude. The second method has been found to be the most desirable approach but has resulted in barometric pressure correction mechanisms which are costly and complex.

A still further object of the present invention is to provide an improved barometric pressure correction mechanism whereby ground level may be read as elevation above sea level.

Barometric pressure correction mechanisms are known in the altimeter art whereby sea level is indicated as zero feet of altitude and such a mechanism may be found in my copending application Serial Number 91,386 filed February 24, 1961 and assigned to the assignee of the present invention.

A still further object of the present invention is to provide an improvement in barometric pressure correction mechanism over the types disclosed in the aforementioned application.

2

Altimeters including barometric pressure correction of the type disclosed in the aforementioned application comprise a pressure tight unit including a housing having a rotating interior cage on which the pressure sensing means and the instrument mechanism are mounted, which mechanism is connected to a pressure altitude indicating means readable on the face of the instrument. The cage and thus the pressure altitude indicating means are rotated in accordance with barometric pressure by means of a knob accessible for movement exteriorly of the housing. Rotation of the knob will also move a barometric pressure indicating means readable on the face of the instrument. The movement between the pressure indicating means (in feet of altitude) and the barometric pressure indicating means (in inches of mercury) is a non-linear movement since the relationship between barometric pressure and pressure altitude is no-linear. An altimeter having the aforementioned barometric pressure correction requires a complex mechanical movement between the barometric pressure input at the knob and the pressure altitude movement (barometric pressure correction in feet of altitude) of the rotating cage. The mechanical movements for barometric compensation of existing altimeters include a complex combination of differentials, step down gearing, cams, and followers.

A still further object of the present invention is to provide an improved mechanical movement in and altimeter to convert an input of barometric pressure represented as inches of mercury to a pressure altitude represented as feet of altitude.

A still further object of the present invention is to provide a simplified barometric pressure correction mechanism which eliminates the necessity of differentials and decreases the amount of gear reduction.

Certain of these objects are realized in the invention by the provision of a helical gear set having one of said gears driven by an input motion, a cam means for axially positioning said helical gear set, said positioned helical gear having a rotational motion non-linear with said input motion.

The foregoing and other objects and advantages of the invention will appear more fully hereinafter from a consideration of the detailed description which follows; taken together with the accompanying drawing wherein an embodiment of the invention is illustrated. It is to be expressly understood, however, that the drawing is for the purpose of illustration and description and is not to be construed as defining the limits of the invention.

The single figure of the drawing is a schematic showing of a motion correction mechanism embodying the invention as such mechanism may be employed in a altimeter having barometric pressure correction.

Referring now to the drawing, there is shown a barometric pressure correction mechanism 40 which is enclosed within a pressure tight housing (not shown) of an altimeter. Cage member 41 on which the pressure sensing means (not shown) and instrument mechanism (not shown) are mounted is disposed for rotation within the altimeter housing. A dial face (not shown) is in a fixed position relative to the altimeter housing having markings thereon for indicating altitude and a window formed therethrough for viewing counter 42 indicating barometric pressure in inches of mercury. Pointer 43 is movable relative to the dial face and is connected to the instrument mechanism by means of pointer shaft 44. The rotation of shaft 44 is directly proportional to true feet of pressure altitude which is indicated on the dial face by the pointer 43. Pointer 43 will move in response to changes in pressure sensed by the pressure sensing means and it will also move with the rotation of cage member 41.

On landing an air vehicle, and in flight above ground level, a correct indication of altitude above sea level is a necessity. To this end the barometric pressure correction mechanism 40 of the altimeter is used. The adjusting knob 45 located outside the altimeter housing is rotated so that the corrected sea level barometric pressure is indicated on barometric counter 42. Adjusting knob 45 rotates drive shaft 46 on which cage drive pinion spur gear 11 and barometric counter pinion spur gear 21 are mounted.

The cage 41 is driven by means of a cage gear train 10 which comprises pinion spur gear 11, intermediate spur gears 12 and 13 and cage spur gear 14 which is mounted on the cage 41.

The counter 42 is driven by means of a counter gear train 20 which comprises pinion spur gear 21, spur gear 22, helical gear 23, cam positioned helical gear 24, cam positioned spur gear 25, pinion spur gear 26, drive bevel gear 27, and follower bevel gear 28 which is mounted on the counter shaft 47.

Cam 48 is rotated by means of a cam gear train 30 which comprises cam pinion spur gear 31 and follower spur gear 32 mounted on cam 48.

Adjusting knob 45 through shaft 46 and counter gear train 20 rotates counter 42 which indicated barometric pressure in inches of mercury. A corresponding rotation of cage 41 is accomplished by shaft 46 through gear train 10. The rotation of cage 41 imparts rotation to the shaft 44 and pointer 43 which will indicate the incremental increase or decrease in feet of altitude corresponding to the increase or decrease in barometric pressure setting indicated in inches of mercury on counter 42. The movement between pointer 43 and counter 42 is a non-linear movement since the relationship between barometric pressure and pressure altitude is non-linear. This non-linearity is overcome by means of the positioning of helical gear 24 of counter gear train 20 by means of cam gear train 30.

In order to more clearly illustrate the present invention, an example of the gearing which may be employed is as follows: It is to be expressly understood that the invention should not be considered to be limited thereto.

CAGE GEAR TRAIN 10

| Gear Name | Drawing Number | Number of Teeth |
|---|---|---|
| Pinion Spur Gear (Cage) | 11 | 26 |
| Intermediate Spur Gear | 12 | 16 |
| Intermediate Spur Gear | 13 | 22 |
| Cage Spur Gear | 14 | 177 |

COUNTER GEAR TRAIN 20

| Pinion Spur Gear (Counter) | 21 | 26 |
|---|---|---|
| Spur Gear | 22 | 30 |
| Helical Gear | 23 | 18 |
| Cam Positioned Helical Gear | 24 | 18 |
| Cam Spur Gear | 25 | 35 |
| Pinion Spur Gear | 26 | 14 |
| Drive Bevel Gear | 27 | 14 |
| Follower Bevel Gear | 28 | 14 |

CAM GEAR TRAIN 30

| Pinion Spur Gear (Cam) | 31 | 13 |
|---|---|---|
| Follower Spur Gear | 32 | 35 |

In the above example, helical gear 24 will rotate one revolution when axially displaced 1.3025 inches when helical gear 23 remains fixed. Gearing as above will correct for the non-linear relationship between barometric pressure and pressure altitude.

Referring now to the details of the counter gear train 20 and cam gear train 30. The gears of trains 20 and 30 are mounted on or disposed for rotation on two parallel shafts, pinion shaft 49 and cam shaft 50. Shafts 49 and 50 are perpendicular to and freely rotatable in parallel mounting plates 51 and 52 which are in a fixed position relative to the instrument housing and are disposed between the instrument face and cage member 41.

Adjustable knob 45 through shaft 46 rotates counter pinion spur gear 21 and meshes with spur gear 22. Spur gear 22 is axially aligned with helical gear 23 and connected for rotation therewith by mounting the gear on mounting hub 53 which is fixed to pinion shaft 49. Helical gear 23 engages mating cam positioned helical gear 24 mounted on hub 54 which is rotatable relative to cam shaft 50 and axially displaceable relative to the shaft 50. Cam spur gear 25 is mounted on hub 54 and has cam follower 55 mounted thereon. Follower 55 is biased toward cam 48 by means of compression spring 56 disposed within hub 54 and biasing against end 57 of hub 54 and shoulder 58 of cam shaft 50. Both cam helical gear 24 and cam spur gear 25 are mounted on hub 54 and are positioned relative to axis of shaft 50 by means of cam 48.

Hub 59 having pinion spur gear 26, drive bevel gear 27, and cam pinion spur gear 31 mounted thereon is disposed on pinion shaft 49 and is freely rotatable therewith. Pinion spur gear 26 is disposed for engagement with cam spur gear 25. Rotation of spur gear 25 imparts rotation of bevel gear 27 through spur gear 26 and hub 59. Bevel gear 27 meshes with bevel gear 28 which is mounted on counter shaft 47. Thus direct rotation is imparted to barometric counter 42 by means of gears 21 through 28 of gear train 20.

Helical gear 24 is positioned along the axis of cam shaft 50 by means of cam gear train 30. Cam pinion spur gear 31 is rotatable by means of knob 45 and counter gear train 20 as heretofore described. Follower spur gear 32 meshes with spur gear 31 and is mounted on cam shaft 50 for rotation therewith. Cam 48 is axially aligned with spur gear 32 and disposed for rotation therewith by means of a common mounting on cam shaft 50. Cam 48 includes a limit stop 60 whereby the relative rotation of cam 48 to cam spur gear 25 can not exceed one revolution. Positioning of cam helical gear 24 on shaft 50 is accomplished by the relative position of cam follower 55 on cam 48. While the relative rotation of cam 48 to spur gear 25 is less than one revolution the actual rotation of cam 48 and gear 25 exceeds one revolution. This is accomplished by means of cam gear train 30 and eliminates the necessity of step-down gearing whereby the cam is limited to one revolution. This is more clearly illustrated by referring to the gearing example set forth above wherein 13.42 revolutions of knob 45: rotates barometric counter 42 over an indicating range of 28.10 to 31.0 inches of mercury; rotates cam 48 relative to gear 25 less than 1 revolution; and rotates cam 48 approximately 10 revolutions and gear 25 approximately 11 revolutions.

The barometric correction mechanism 40 includes a zero set function whereby the cage member 41 is rotated to adjust pointer 43 to indicate zero feet of altitude on the dial face. This is accomplished by moving knob 45 away from the instrument face against the bias of a spring (not shown) and thereby disengaging counter pinion spur gear 21 and spur gear 22 and maintaining cage pinion spur gear 11 in engagement with intermediate spur gear 12. The adjusting knob 45 will then rotate pointer 43 through gear train 10 and cage member 41 as heretofore described.

While the barometric correction mechanism shown in the drawing is of construction shown and described, it is understood that the instant invention is not limited to any particular form or construction. Moreover, other changes and modifications of the novel barometric correction mechanism contemplated herein may be made by those skilled in the art without departing from the scope of the instant invention.

I claim:

1. A mechanical correction mechanism for producing a non-linear output motion from a driven linear input motion comprising (a) a drive shaft, (b) a cam shaft substantially parallel to said drive shaft, (c) a first helical gear concentrically disposed on said drive shaft and movable in response to said input motion, (d) a second helical gear meshing with said first helical gear and concentrically disposed on said cam shaft for axial displacement relative to said first helical gear, (e) a cam concentrically disposed on said cam shaft and driven by said input motion, (f) a cam displaced spur gear concentrically disposed on said cam shaft and positioned to rotate and axially displace with said second helical gear having a rotation proportional to said output motion.

2. A mechanical correction mechanism compensating for the non-linear relationship between a linear input motion and a desired non-linear output comprising
(a) a drive shaft,
(b) a cam shaft substantially parallel to said drive shaft,
(c) a first helical gear disposed on said drive shaft, and movable in response to said input motion,
(d) a helical gear and spur gear set loosely mounted on said cam shaft having said gears of said set disposed for common rotational and axial movement, said helical gear of said set meshing with said first helical gear and disposed for axial displacement relative to said first helical gear,
(e) a cam angularly positioned in response to said input motion and mounted on said cam shaft to axially displace said gear set relative to said first helical gear,
(f) a spur gear loosely mounted on said drive shaft and meshing with said spur gear of said gear set having a rotation proportional to said non-linear output motion.

3. A mechanical correction mechanism compensating for the non-linear relationship between a linear input motion and a desired non-linear output motion comprising
(a) a drive shaft,
(b) a cam shaft substantially parallel to said drive shaft,
(c) a first helical gear disposed on said drive shaft, and movable in response to said input motion,
(d) a helical gear and spur gear set loosely mounted on said cam shaft having said gears of said set disposed for common rotational and axial movement, said helical gear of said set meshing with said first helical gear and disposed for axial displacement relative to said first helical gear,
(e) a cam angularly positioned in response to said input motion and mounted on said cam shaft to axially displace said gear set relative to said first helical gear, said positioned gear set having a rotation proportional to said non-linear output motion,
(f) gear means for imparting to said cam a rotation greater than one revolution for a relative rotation of said cam and said spur gear of less than one revolution.

4. The invention defined in claim 3 including stop means for limiting the relative rotational motion of said cam and said spur gear to less than one revolution.

5. A mechanical correction mechanism compensating for the non-linear relationship between a linear input motion and a desired non-linear output comprising,
(a) a drive shaft,
(b) a cam shaft substantially parallel to said drive shaft,
(c) a first helical gear concentrically mounted on said drive shaft and movable in response to said input motion,
(d) a helical gear and spur gear set concentric with and loosely disposed on said cam shaft having said gears of said set disposed for common rotational and axial movement relative to said cam shaft, said helical gear of said set meshing with said first helical gear and disposed for axial displacement relative to said first helical gear,
(e) a cam having a non-linear surface, angularly positioned in response to said input motion and concentric with and mounted on said cam shaft,
(f) a cam follower mounted on said spur gear of said gear set,
(g) a spring means biasing said cam follower against the non-linear surface of said cam thereby positioning said follower and said gear set according to the contour of said non-linear surface of said cam,
(h) said cam axially displacing said gear set relative to said first helical gear, said gear set having a rotation proportional to said output motion,
(i) gear means for imparting to said cam a rotation greater than one revolution for a relative rotation of said cam and said spur gear of less than one revolution,
(j) stop means for limiting the relative rotational motion of said cam and said spur gear to less than one revolution.

6. A barometric pressure correction mechanism compensating for the non-linear relationship between barometric pressure and pressure altitude for use in an altimeter wherein correction is made for variations in indicated pressure altitude incident to variations in barometric pressure corrected to sea level comprising,
(a) means for representing pressure altitude;
(b) means for representing barometric pressure corrected to sea level;
(c) drive means for moving said second mentioned means in accordance with variations in corrected sea level pressure and for moving said first mentioned means as a function of variations in corrected sea level pressure whereby to alter said representation comprising;
(d) a first gear train drivingly connecting said drive means and said first mentioned means;
(e) a second gear train drivingly connecting said drive means and said second mentioned means, including,
(f) a drive shaft and a cam shaft means substantially parallel to said drive shaft,
(g) a first helical gear disposed on said drive shaft and movable in response to said drive means,
(h) a helical gear and spur gear set loosely mounted on said cam shaft having said gears of said set disposed for common rotational and axial movement, said helical gear of said set meshing with said first helical gear and disposed for axial displacement relative to said first helical gear,
(i) a cam angularly positioned in response to said drive means and mounted on said cam shaft to axially displace said gear set relative to said first helical gear,
(j) a spur gear loosely mounted on said drive shaft and meshing with said spur gear set having a non-linear rotation relative to said drive means.

7. A barometric pressure correction mechanism compensating for the non-linear relationship between barometric pressure and pressure altitude for use in an altimeter wherein correction is made for variations in indicated pressure altitude incident to variations in barometric pressure corrected to sea level comprising,
(a) means for representing pressure altitude;
(b) means for representing barometric pressure corrected to seal level;
(c) drive means for moving said second mentioned means in accordance with variations in corrected sea level pressure and for moving said first mentioned means as a function of variations in corrected sea level pressure whereby to alter said representation comprising;
(d) a first gear train drivingly connecting said drive means and said first mentioned means;
(e) a second gear train drivingly connecting said drive means and said second mentioned means, including, (f) a drive shaft and a cam shaft means substantially parallel to said drive shaft, (g) a first helical gear disposed on said drive shaft and movable in response to said drive means, (h) a helical gear and spur gear set loosely mounted on said cam shaft having said gears of said set disposed for common rotational and axial movement, said helical gear of said set meshing with said first helical gear and disposed for axial displacement relative to said first helical gear, (i) a cam angularly positioned in response to said drive means and mounted on said cam shaft to axially displace said gear set relative to said first helical gear, said positioned gear set having a non-linear rotation relative to said drive means, (j) gear means for imparting to said cam a rotation greater than one revolution for a relative rotation of said cam and said spur gear of less than one revolution.

8. The invention defined in claim 7 including stop means for limiting the relative rotational motion of said cam and said spur gear to less than one revolution.

9. A barometric pressure correction mechanism compensating for the non-linear relationship between barometric pressure and pressure altitude for use in an altimeter wherein correction is made for variations in indicated pressure altitude incident to variation in barometric pressure corrected to sea level comprising, (a) a pointer representing pressure altitude;

(b) a counter representing barometric pressure corrected to sea level;

(c) a barometric pressure setting means including a manually operable drive means for moving said counter in accordance with corrected sea level pressure and said pointer as a function of variations in corrected sea level pressure whereby to alter said representation comprising;

(d) a first gear train drivingly connecting said drive means and said pointer, (e) a second gear train drivingly connecting said drive means and said counter including, (f) a drive shaft, (g) a cam shaft substantially parallel to said drive shaft, (h) a first helical gear concentrically mounted on said drive shaft and movable in response to said drive means, (i) a helical gear and spur gear set concentric with and loosely disposed on said cam shaft having said gears of said set disposed for common rotational and axial movement relative to said cam shaft, said helical gear of said set meshing with said first helical gear and disposed for axial displacement relative to said first helical gear, (j) a cam having a non-linear surface, angularly positioned in response to said drive means and concentric with and mounted on said cam shaft, (k) a cam follower mounted on said spur gear of said gear set, (l) a spring means biasing said cam follower against the non-linear surface of said cam thereby positioning said follower and said gear set according to the contour of said non-linear surface of said cam, (m) said cam axially displacing said gear set relative to said first helical gear, said gear set having a non-linear rotation relative to motion of said drive means, (n) gear means for imparting to said cam a rotation greater than one revolution for a relative rotation of said cam and said spur gear of less than one revolution, (o) stop means for limiting the relative rotational motion of said cam and said spur gear to less than one revolution.

References Cited by the Examiner
UNITED STATES PATENTS

| | | | |
|---|---|---|---|
| 2,355,990 | 8/1944 | Menzer | 73—387 |
| 2,922,313 | 1/1960 | Penny | 73—387 X |
| 3,043,156 | 7/1962 | Hannon | 74—393 |

LOUIS R. PRINCE, *Primary Examiner.*

ROBERT L. EVANS, RICHARD C. QUEISSER,
*Examiners.*